Patented Jan. 15, 1935

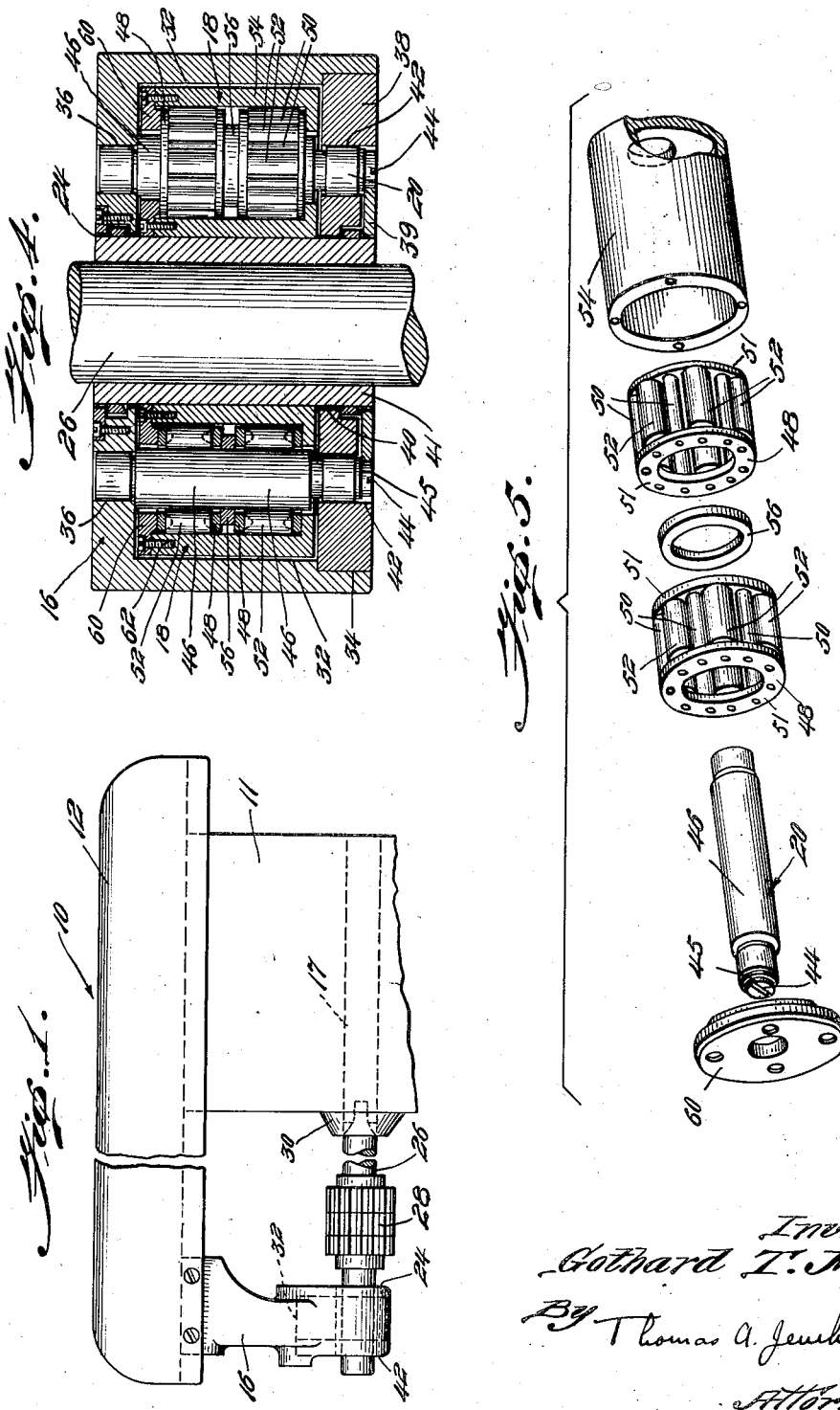

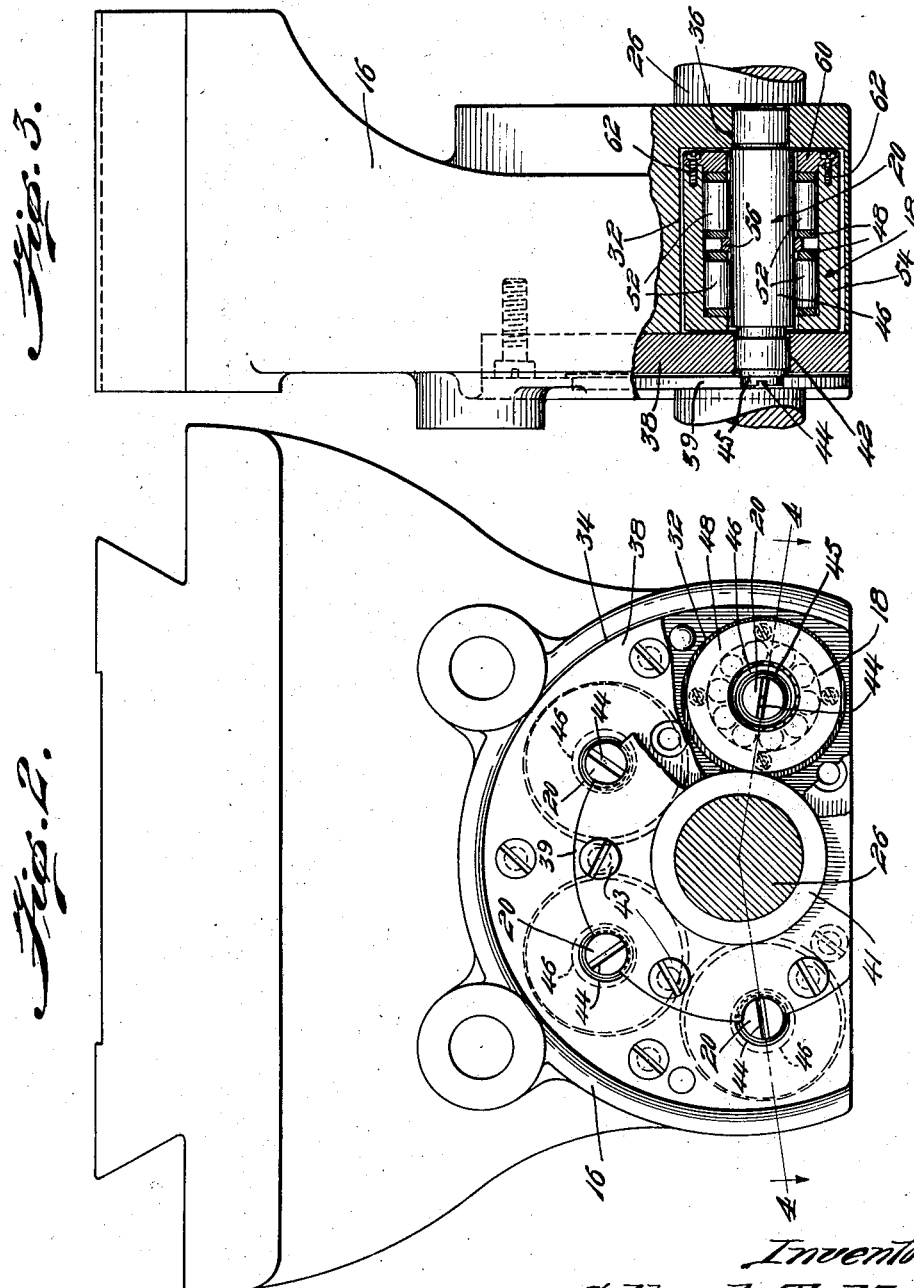

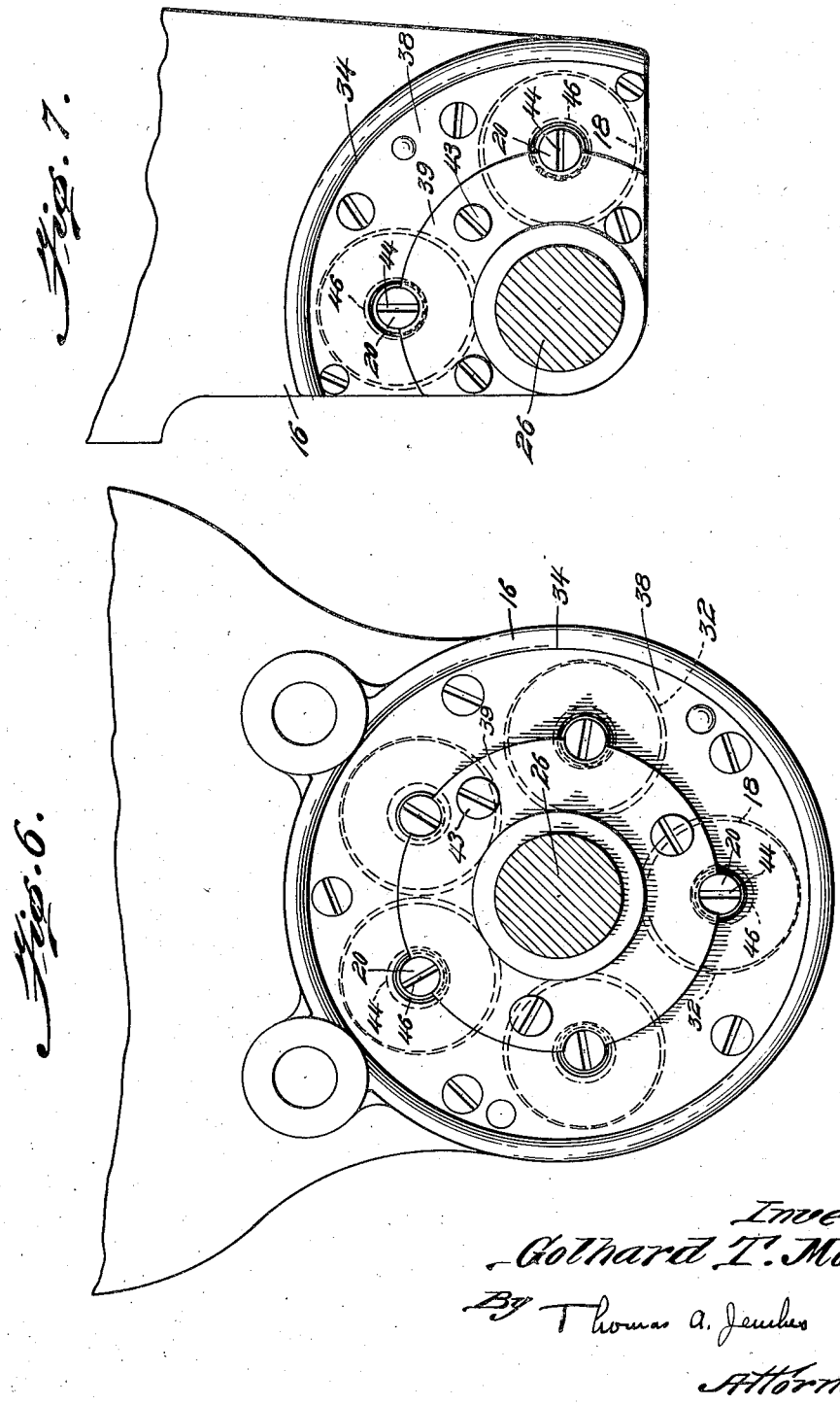

1,988,326

UNITED STATES PATENT OFFICE 1,988,326

METAL WORKING MACHINE

Gothard T. Moo, Cranston, R. I., assignor to Brown & Sharpe Mfg. Co., Providence, R. I., a corporation of Rhode Island Application February 15, 1932, Serial No. 592,944

4 Claims. (Cl. 90—18)

My invention relates to bearings for rotatable spindles of metal working machines, particularly for milling, gear cutting or hobbing machines having an arbor yoke for supporting the cutting arbor or spindle thereof.

An object of my invention is to provide roller bearing units for rotatable spindles of this description having a large plurality of bearing surfaces, in my preferred embodiment each having three lines of contact of rotatable contacting surfaces supporting said spindle.

A further object of my invention is to provide a bearing means for metal working machines having a rotatable spindle consisting of a plurality of bearing units with a novel type of eccentric adjusting means for adjusting each bearing unit relative to the rotating spindle as the spindle wears down in use and also in the initial adjustment thereof to accurately align and adjust the same regardless of misalignment of the bearing supporting means and without any play for accurate cutting and a means which once it has been set may be permanently locked in use until another setting thereof is desired.

A further object of my invention is to provide a construction of a bearing unit having rolling surfaces constructed of a minimum number of working parts so that the cutting tools can get close to the work, and bearings which may be readily adjustable from the front of the machine.

A further feature of my improved specific construction is to provide a construction of roller bearing unit having a plurality of roller contacting surfaces which may be readily oiled in use and whether two or a large plurality of bearings be employed may be readily set to accurately align the spindle or arbor in use.

A further object of my invention is to provide in a machine employing a rotating spindle and a detachable arbor therefor to rotate therewith, means to align the detachable arbor to the center of spindle rotation regardless of any misalignment of the arbor supporting surfaces, thus in a milling machine regardless of misalignment of a two arm or capped over arm supporting structure.

A further object of my invention is to provide means to deliberately spring the center of the arbor or spindle out of its true rotating center to counteract heavy pressures caused by the tool in use.

As I preferably employ roller bearings, which have rolling instead of sliding contact, oil is not required for the proper lubrication between the bearing and the arbor, and thus by eliminating the oil film space formerly required, it is possible to achieve more accurate alignments of the spindle or arbor. By providing roller action in the bearings, I am also enabled to largely eliminate friction and thus require less power for driving the spindle or arbor than formerly.

These and such other objects of my invention as may hereinafter appear will be best understood from a description of various embodiments thereof applied to a milling machine, such as are shown in the accompanying drawings.

In the drawings, Fig. 1 is a diagrammatic side elevation of the adjustable overhanging arm and cutter arbor and yoke of a standard milling machine.

Figure 2 is an enlarged front elevation thereof with portions of the front plates of the arbor yoke being broken away and employing roller bearings more than half surrounding the cutter arbor to give it a substantial amount of support throughout its periphery.

Fig. 3 is an enlarged side elevation of the cutter arbor yoke shown in Fig. 1 partially broken away to show the interior construction of one of my improved bearing units.

Fig. 4 is a sectional view taken along the line 4—4 of Fig. 2.

Fig. 5 is a disassembled perspective view of one of my improved bearing units.

Fig. 6 is a front elevation of a modified form of my invention employing five of my improved bearing units substantially surrounding a cutter arbor.

Fig. 7 is a front elevation of a different embodiment of my invention employing only two of my improved bearing units, substantially 45° apart to support the rotatable arbor.

In the drawings, wherein like characters of reference indicate like parts throughout, 10 generally indicates a portion of a standard type of milling machine having an adjustable overhanging arm and employing the improved bearing units of my invention, although it is obvious that any type of a metal working machine having a rotatable spindle may be employed.

In the drawings, 11 generally indicates the column of a standard type of milling machine having the yoke supporting arm 12 thereon. The arm 12 is adjustable on the column 11 as usual and the arbor yoke 16 is also horizontally adjustable on said arm in a well known manner.

Particularly in milling machines, in the prior art all sorts of means have been provided to accurately center the front portion of the detachable cutter arbor, preferably relatively to the permanently rotating spindle 17 thereof. According to the principles of a base angle a plurality of overhanging arms have been employed. Employing my invention, however, in which a plurality of bearing units are eccentrically adjustable in the arbor yoke to readily align the front end of the cutter arbor, it is only necessary to employ, if desired, a single supporting arm and adjust the cutter arbor bearings within the cutter yoke thereof. There has also been experienced in milling machines considerable difficulty in providing sufficient bearing surfaces. Employing my improved units, however, I am enabled to provide bearings having a minimum amount of friction for the cutter arbor which may be accurately aligned with any type of overhanging arm means. I also provide a roller bearing structure which I believe is novel in this type of metal working machine, and a novel means of adjustment for accurately aligning the outer end of the cutter arbor or any portion thereof and for locking it in adjusted position and for these purposes, I provide a plurality of roller bearing means 18 for the spindle or cutter arbor and adjusting eccentric members or rods 20 supporting each roller bearing means 18 and adapted on rotation to adjust each roller bearing means 18 relatively to said spindle or cutter arbor to accurately align said cutter arbor. Employing a plurality of my improved eccentric members 20 however, it is obvious that it is possible to accurately align the outer end of a cutter arbor with a single overhanging arm and by means of a simple adjustment of the eccentric members regardless of misalignments of the overhanging arm means. I preferably so construct each of my improved rotatable roller bearing means that there will at all times be at least three lines of contact between rotatable contacting surfaces supporting said spindle or cutter arbor and so that all bearing means are radially adjustable relative thereto and positioned relative to each other in a manner to support said spindle and center it to the desired amount.

My invention specifically includes a rotatable bearing unit including a center eccentric adjusting rod 20 which as more specifically shown in Figs. 3, 4 and 5 is made eccentric so as to adjust the other rotatable parts of my improved bearing unit relative to the rotating arbor or spindle. In the improved embodiment of my invention shown applied to a milling machine I provide a single adjustable arbor yoke supporting overhanging arm 12 with the arbor yoke 16 adjustable relative thereto.

The arbor yoke 16 is provided with a hole 24 for supporting the cutter arbor 26 having the usual cutting means 28 thereon in conjunction with the usual center 30 on the column 11.

In the improved embodiment of my invention shown the arbor yoke 16 is provided with the arbor and/or arbor sleeve hole 24 therein and a hollow central bearing receiving portion 32 extending around said arbor hole 24, substantially the circumferential amount necessary to permit the mounting of the desired number of roller bearing units therein, in my preferred embodiment shown in Figs. 1–5 substantially three quarters of the way around, in the embodiment shown in Fig. 6 substantially all the way around and in the embodiment shown in Fig. 7 employing only two roller bearing units 18 substantially a quarter of the way around to center, support and align the cutter arbor in two planes substantially at right angles to each other and employing only two roller bearing units. While the bearing receiving portion 32 may be continuous, it preferably consists of the separate cylindrical pockets 32 shown. In my preferred embodiment shown the arbor yoke 16 is provided with an open front portion 34 and a plurality of rod supporting holes 36 in the rear thereof. In order that my improved roller bearing units may be firmly secured, I provide the detachable front plate 38 for the front of said arbor having the arbor and/or arbor sleeve hole 40 therein and a plurality of aligned rod holes 42 aligned with said rear rod holes 36.

As I stated hitherto, I provide a plurality of rod means 20 mounted in said front and rear rod holes 42 and 36 respectively having exposed turning slots 44 in the front end thereof and the central eccentric portions 46 as more particularly shown in Figs. 3 and 5.

While any type of rotatable bearing means may be mounted on said eccentric rods 20, I preferably provide the squirrel cage bearings 48 rotatably mounted on said eccentric rods 20 having the longitudinal tie rods 50 joining each cylindrical end portion 51 thereof together and the roller bearings 52 rotatably mounted on said longitudinal tie rods 50 or on means projecting inwardly from said ends 51 intermediate the connecting tie rods 50 as shown. It is apparent that in employing this structure, I employ three lines of contact of rotatable contacting surfaces including one between the peripheries of the roller bearings 52 contacting the periphery of the eccentric portions 46 of the rod means 20. In the preferred embodiment shown I also preferably employ the rotatable cylinders 54 rotatably mounted over said squirrel cage bearings 48 and the roller bearings 52 thereof adapted to contact the arbor 26 itself or arbor sleeve 41 and said bearings 48, thus forming three roller lines of contact; one, between the sleeve 41 stationarily attached to the cutter arbor 26 which contacts the outer periphery of the rotatable cylinder 54; two, which in turn contacts the outer peripheries of the roller bearings 52 of the squirrel cage bearings 48; and three, the inner peripheries of the roller bearings 52 contacting the outer surface 46 of the adjustable eccentric rod means 20. It is thus obvious that on rotatable adjustment of the eccentric portions 46 of the rotatable rods 20 that each of my improved bearing means 18 can be adjusted relative to the spindle on rotation of said eccentric rod means 20. In my preferred embodiment shown I have shown a plurality of squirrel cage bearings 48, preferably two in each bearing unit separated by means of the washers 56 and located within the rotatable cylindrical bearings 54. I also preferably provide the individual cylinder caps 60 which may as shown in Fig. 3 be detachably secured to the ends of the cylinders 54 of each bearing unit by means of the screws 62 to make an assembled bearing unit 18 eccentrically adjustable relative to the rotatable arbor or spindle 26. It is apparent therefore that when my improved bearing units are assembled that manual adjustment can be readily made from outside preferably in front, in the embodiment shown, of the arbor yoke of my improved milling machine by means of a screw driver or other instrument inserted within the adjusting slots 44.

In my preferred embodiment shown, the disassembled units shown in Fig. 5 are assembled together as shown in Fig. 4 and are inserted within the pocket portions 32 of the arbor yoke, the number depending on the number of the pockets 32 of the arbor yoke, whether it be the two substantially at right angles to each other as shown in Fig. 7, a plurality surrounding the entire periphery as shown in Fig. 6, or a plurality three-quarters or less down to one-quarter surrounding the periphery as shown in Fig. 7. When it is desired to center the arbor, each adjusting rod means 20 is adjusted so as to center its respective roller bearing means relative to the other roller bearing means to center the spindle to the desired amount. In the embodiment shown I employ a substantial front locking plate 39 detachably securable to the front plate 38 by means of the screws 43. It is thus apparent that when the locking plate 39 is attached it will bear against a shoulder 45 near the front ends of each eccentric member 20, and that the rear ends of the eccentric features 46 will abut the front face of the rear wall portion of said arbor yoke to tightly frictionally bind the eccentric members 20 in the compartments 32 so that on turning the eccentric members 20 by means of the slots 44 they may be frictionally locked in any desired set position.

It is apparent that I have provided a construction particularly adapted for use in metal working machines having a rotatable spindle which may be readily adjusted with a single overhanging arm or any type of overhanging arm means, which will accurately align the spindle regardless of misalignments of its supporting means, which will bring each individual roller bearing in metal to metal contact with the spindle and a structure in which each individual roller bearing unit may be adjusted to bring the center of the spindle out of its true rotating center to counteract heavy tool pressure, and which employs three lines of roller contacting surfaces to cut down the friction present in former designs of this description.

It is understood that my invention is not limited to the specific embodiments shown and that various deviations may be made therefrom without departing from the spirit and scope of the appended claims.

What I claim is:

1. In a milling machine, a rotatable spindle permanently mounted thereon, overhanging arm means, arbor yoke means adjustably mounted on said overhanging arm means, a detachable cutter arbor having an inner end adapted to be supported and rotated by said rotatable spindle, and an outer end adapted to be supported by said arbor yoke means, said arbor yoke means having a plurality of bearing means for said arbor mounted therein at least partially circumferentially of said arbor and means to independently adjust and lock each of said bearing means to spring said arbor out of its true rotating center and/or to accurately align the cutting position of said arbor regardless of misalignments in said overhanging arm means, each comprising an eccentric rod mounted on said machine rotatable from outside of said machine, a squirrel cage bearing rotatably mounted on said eccentric rod having ends, means connecting said ends, and roller bearings between said ends, and a rotatable cylinder rotatably mounted over said squirrel cage bearing adapted to contact the arbor and to be adjusted relative thereto on manual rotation of said eccentric rod.

2. In a milling machine, a rotatable spindle permanently mounted thereon, overhanging arm means, arbor yoke means adjustably mounted on said overhanging arm means, a detachable cutter arbor having an inner end adapted to be supported and rotated by said rotatable spindle, and an outer end adapted to be supported by said arbor yoke means, said arbor yoke means having a plurality of bearing means for said arbor mounted therein at least partially circumferentially of said arbor and means to independently adjust and lock each of said bearing means to spring said arbor out of its true rotating center and/or to accurately align the cutting position of said arbor regardless of misalignments in said overhanging arm means, each comprising an eccentric rod mounted on said machine manually rotatable from outside of said machine, a squirrel cage bearing rotatably mounted on said eccentric rod having ends, means connecting said ends and roller bearings mounted between said ends adapted to contact the arbor and to be adjusted relative thereto on manual rotation of said eccentric rod.

3. In a milling machine, a rotatable spindle permanently mounted thereon, overhanging arm means, arbor yoke means adjustably mounted on said overhanging arm means, a detachable cutter arbor having an inner end adapted to be supported and rotated by said rotatable spindle, and an outer end adapted to be supported by said arbor yoke means, said arbor yoke means having a plurality of bearing means for said arbor mounted therein at least partially circumferentially of said arbor and means to independently adjust and lock each of said bearing means to spring said arbor out of its true rotating center and/or to accurately align the cutting position of said arbor regardless of misalignments in said overhanging arm means, each comprising an eccentric rod mounted on said machine manually rotatable from outside of said machine, a squirrel cage bearing rotatably mounted on said eccentric rod and a rotatable cylinder rotatably mounted on said squirrel cage bearing adapted to contact the arbor and to be adjusted relative thereto on manual rotation of said eccentric rod.

4. In a milling machine, a rotatable spindle permanently mounted thereon, overhanging arm means, arbor yoke means adjustably mounted on said overhanging arm means, a detachable cutter arbor having an inner end adapted to be supported and rotated by said rotatable spindle, and an outer end adapted to be supported by said arbor yoke means, said arbor yoke means having a plurality of bearing means for said arbor mounted therein at least partially circumferentially of said arbor and means to independently adjust and lock each of said bearing means to spring said arbor out of its true rotating center and/or to accurately align the cutting position of said arbor regardless of misalignment in said overhanging arm means, each bearing means comprising an eccentric rod mounted on said machine manually rotatable from outside of said machine and a rotatable cylinder rotatably mounted over said rod adapted to contact the arbor and to be adjusted relative thereto on manual rotation of said eccentric rod.

GOTHARD T. MOO.